H. LAFKOWITZ.
APPARATUS FOR CARBONATING LIQUIDS.
APPLICATION FILED DEC. 6, 1909.
1,119,615.
Patented Dec. 1, 1914.
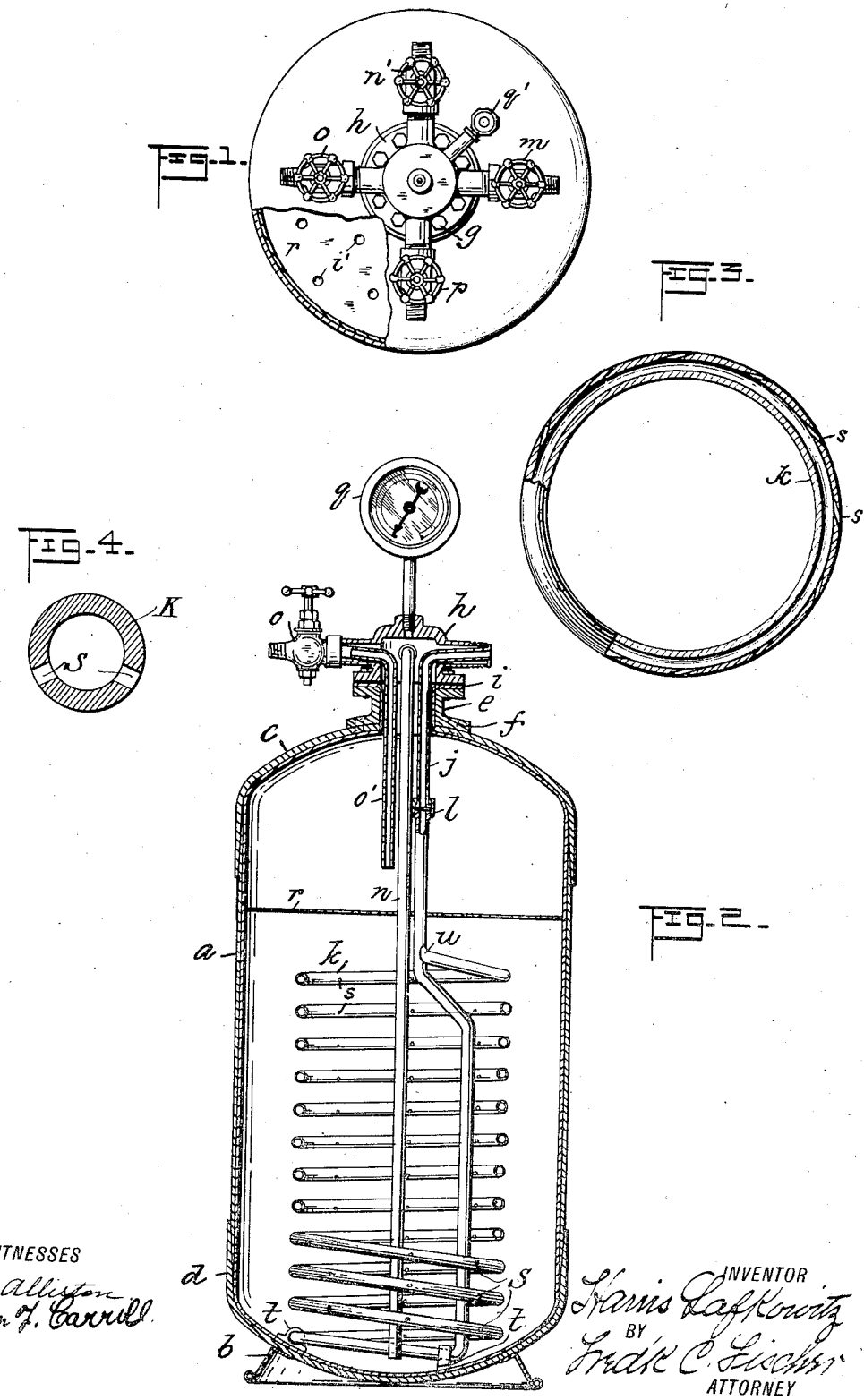

UNITED STATES PATENT OFFICE.

HARRIS LAFKOWITZ, OF NEWARK, NEW JERSEY, ASSIGNOR TO THE FIRM OF GASH & LAFKOWITZ, OF NEWARK, NEW JERSEY.

APPARATUS FOR CARBONATING LIQUIDS.

1,119,615.  Specification of Letters Patent.  Patented Dec. 1, 1914.

Application filed December 6, 1909. Serial No. 531,518.

*To all whom it may concern:*

Be it known that I, HARRIS LAFKOWITZ, a citizen of the United States, residing in the city of Newark, in the county of Essex and State of New Jersey, have invented certain new and useful Improvements in Apparatus for Carbonating Liquids, of which the following is a full, clear, and exact description of the invention, such as will enable others skilled in the art to which it appertains to make, construct, and use the same, reference being had to the accompanying drawings, and to letters of reference marked thereon, forming a part of this specification.

My invention relates to improvements in apparatus for making carbonated or aerated liquids, and the object of the invention is to furnish an apparatus which makes the carbonating process automatic, whereby agitating devices to be operated manually, or otherwise, may be dispensed with, and which shall be inexpensive in its construction, and efficient in its operation.

The invention will be understood by reference to the accompanying drawings, in which—

Figure 1 is a plan view of my improved apparatus, partly broken away, to illustrate the construction of the baffle plate. Fig. 2 is a vertical longitudinal section taken through a tank equipped with my improvements; Fig. 3 is an enlarged sectional plan view of a modified form of one of the coils of the coiled pipe, illustrating the holes tangentially arranged by means of which the gas is introduced to the water, and Fig. 4 is an enlarged sectional view of one of the coils of the perforated pipe illustrating the perforations or holes $s$ by means of which the gas is introduced to the water.

Similar letters of reference refer to like parts throughout the specification and drawings.

In the drawings, $a$ designates a tank mounted on a suitable support $b$, and provided with top and bottom heads $c$ and $d$ respectively. Secured to the top of and forming the neck or opening of the tank, is a collar $e$. This collar may be secured to the tank in any convenient manner, preferably by means of the rivets $f$ shown.

Mounted upon the collar $e$ and secured thereto by means of the bolts $g$ is the head $h$ provided with suitable water and gas inlets and outlets. A gasket $i$ of any suitable material is interposed between the collar $e$ and the head $h$ to insure a water and gas-tight joint.

In the tank $a$ is located a perforated coiled pipe $k$ provided with tangentially arranged holes $s$ throughout its length or perforated as shown in Figs. 2 and 4 for the introduction of gas by way of the pipe $j$, which is connected to the coil by the union $l$ and secured in the opening in the head $h$ and connecting with an exteriorly located valve $m$. This coil of pipe may be secured in the bottom of the tank in any convenient manner, preferably by means of the brackets $t$ shown, and is so constructed that one end of the coil is connected to the pipe $j$ by means of the union $l$ and the other end is connected back to the pipe $k$ at $u$, so as to permit the gas to enter the upper and lower coils of the pipe simultaneously. That portion of the gas conveying pipe $k$ extending from the union $l$ to the bottom of the tank is not provided with perforations, so that the gas will descend and enter the tank at the bottom and escape as it rises to the top.

The holes $s$ may be tangentially arranged in the pipe $k$, (see Fig. 3), so that the escaping gas will give to the water contained in the tank a certain rotary motion, thereby presenting constantly (owing to the rotary motion imparted to the water contained in the tank by the escaping gas through the tangentially arranged holes) new strata or bodies of the water to the escaping gas to be mingled with and rapidly and automatically absorbed by the same.

Passing through the head $h$ is a pipe $n$ extending nearly to the bottom of the tank $a$. The carbonated fluid is drawn off through this pipe, which also connects with an exteriorly-located valve $n'$. The water inlet valve $o$ is inserted in the head $h$ and connecting with the water pipe $o'$ extending into the tank $a$ to maintain the desired water level in the apparatus. An exteriorly-located valve $p$ is also inserted in the head $h$ to permit the escape of air and gas from the tank $a$, when water is being introduced in the same. The top of the head $h$ is provided with an ordinary pressure gage $q$ and the side with a safety valve $q'$.

Conveniently fitted horizontally in the tank $a$ near the top thereof, is a baffle plate $r$ provided with a series of holes $i'$. All the internal parts of the apparatus, such as the baffle plate, the coil, and other pipes are made of block tin, while the tank $a$, top and bottom heads $c$ and $d$, collar $e$ and head $h$ are lined with block tin.

The operation of the device is as follows: The gas introduced through the pipe $j$ by opening the exteriorly located valve $m$, passes down to the union $u$, where it simultaneously enters the top coil of the coiled pipe $k$ and also simultaneously passes down the straight pipe where it enters the bottom coil of the coiled pipe $k$ so as to permit the gas to enter the upper and lower parts of the coiled pipe simultaneously to be discharged through the tangentially or otherwise arranged holes in said pipe, thereby giving to the water contained in the tank a certain rotary motion, through which it rises and passes upward gradually through the water and being thus absorbed rapidly by the same. When the charge of water is carbonated, the liquid is then drawn through the pipe $n$ by means of the exteriorly located valve $n'$.

When it is desired to fill the tank with a new supply of water, the exteriorly-located valve $p$ is opened to permit the escape of air from the tank, and water can be introduced into the same by opening the water inlet valve $o$ which is connected with the water pipe $o'$.

From the above description, it will be apparent that I have produced an apparatus for carbonating liquids possessing the features of advantage enumerated as desirable, and I wish it to be understood that I do not desire to be limited to the exact details of construction shown and described, as obvious modifications will suggest themselves to those skilled in the art.

I claim:

1. In an apparatus for carbonating liquids, the combination with a liquid containing tank, of a head secured to the top of said tank provided with gas and water inlets and outlets, the water outlet pipe extending from said head nearly to the bottom of the tank, and a gas conveying pipe connected to the gas inlet, extending to the bottom of the tank and then coiled in an upward direction, the end of the coiled portion being connected to the straight portion of the gas conveying pipe, and the coiled portion of said pipe being provided with perforations to permit the gas to enter the tank.

2. In an apparatus for carbonating liquids, the combination with a liquid containing tank, of a head secured to the top of said tank provided with gas and water inlets and outlets, the water outlet pipe extending from said head nearly to the bottom of the tank, and a gas conveying pipe connected to the gas inlet, extending to the bottom of the tank and then coiled in an upward direction, the end of the coiled portion being connected to the straight portion of the gas conveying pipe, the coiled portion of said pipe provided with downwardly arranged perforations arranged on the exterior and interior of the coil formed by the pipe to permit the gas to enter the tank.

This specification signed and witnessed this 2nd day of December, 1909.

HARRIS LAFKOWITZ.

Witnesses:
FRED'K C. FISCHER,
C. A. ALLISTON.